United States Patent
Robbins

(10) Patent No.: US 8,543,817 B1
(45) Date of Patent: Sep. 24, 2013

(54) SECURE INDENTIFICATION AND AUTHORIZATION APPARATUS AND METHOD

(76) Inventor: Gregg Wood Robbins, Rogers, AR (US)

(*) Notice: Subject to any disclaimer, the term of this patent is extended or adjusted under 35 U.S.C. 154(b) by 1396 days.

(21) Appl. No.: 11/799,579

(22) Filed: May 2, 2007

Related U.S. Application Data

(60) Provisional application No. 60/797,052, filed on May 3, 2006.

(51) Int. Cl.
*H04L 29/06* (2006.01)

(52) U.S. Cl.
USPC .............................. 713/169; 713/189; 705/75

(58) Field of Classification Search
USPC ................. 713/168, 169, 170, 171, 176, 181, 713/164, 165, 166, 167, 151, 152, 189; 726/4, 726/5, 6, 17, 28, 29, 30; 380/259, 260, 270, 380/37
See application file for complete search history.

(56) References Cited

U.S. PATENT DOCUMENTS

2006/0143453 A1* 6/2006 Imamoto et al. .............. 713/169

* cited by examiner

*Primary Examiner* — Gilberto Barron, Jr.
*Assistant Examiner* — Izunna Okeke

(57) ABSTRACT

A cryptographic system that continuously identifies both the client and server applications/systems without the need for long term secret keying material or traditional encryption techniques. This system continuously derives its keying material from the previous transactionally bound conversation between the client and the server as well as nonces from the server. Because the primary keying material is derived by both the client and server from the transactionally bounded conversation, you can not spoof either the client or the server. The provides for a method for both the client and the server to assure that they are talking to the appropriate peer. All attacks that attempt to copy, forge, or replay the keying material are detected and bound.

16 Claims, 3 Drawing Sheets

SECURE INDENTIFICATION AND AUTHORIZATION APPARATUS AND METHOD

CROSS-REFERENCE TO RELATED APPLICATIONS

Provisional filing for same. Application No. 60/797,052 filing date May 3, 2006

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention relates to a system of identification and authorization systems. In particular, the present invention relates to a system for digital communications over and insecure network that will securely identify and authorize two parties to communicate. The communications may or may not be encrypted or otherwise obfuscated.

2. Description of the Known Art

Tokens, secrets, and encryption techniques have been used throughout recorded history to identify two parties in communications. Proving that one party is who they claim to be is often accomplished by exchange secret information that one the parties involved in the communications will know. Other methods of providing proper identification includes having an identification token or other device. Various method have been used throughout time, but they all revolve around knowing either secret knowledge or possession of something.

In the digital age, encryption techniques are used to determine the identity of the parties attempting to communicate. With techniques involving encryption, the party knows that they are communicating with the appropriate individual based on knowledge of a secret key. This key is used to encrypt all or a portion of the communication between two parties. If one party uses the wrong key, the information sent to the other party will appear to by gibberish. In this manner you since you have knowledge of some secret, the implication is that communication must be with you as only you could know the secret.

U.S. Pat. No. 4,200,770 to Hellman describes a major advance in digital cryptographic systems to determine identity. Messages are sent using a key that can only encrypt messages and a different key is used to decrypt the message. This alleviates the need to share a common key thereby enhancing security by allowing a further restriction of secret keying material distribution.

U.S. Pat. No. 6,370,250 to Stein describes a further enhancement to digital cryptographic systems in that public key and private key systems are combined to make it significantly more difficult to effectively eavesdrop to determine a secret key.

However in today's threat environment, there are programs, viruses, and techniques where an attacker may be able to directly or indirectly determine what your secret key value is. Once they are able to determine your secret key value, they can be identified by a digitally based system as you and determined to be authentic. This attack is further aided by the fact that digital material can easily be copied in a manner that is indistinguishable with the original material.

The Achilles heal in all of the digital systems deployed today is that they require a secret value or values to be kept a secret for a cryptographic system to be effective. Thus we need an improved system that does not need or rely on long term secret keys to operate effectively and which can detect attacks where the keying is duplicated.

DESCRIPTION OF THE PREFERRED EMBODIMENT

Figure 1:
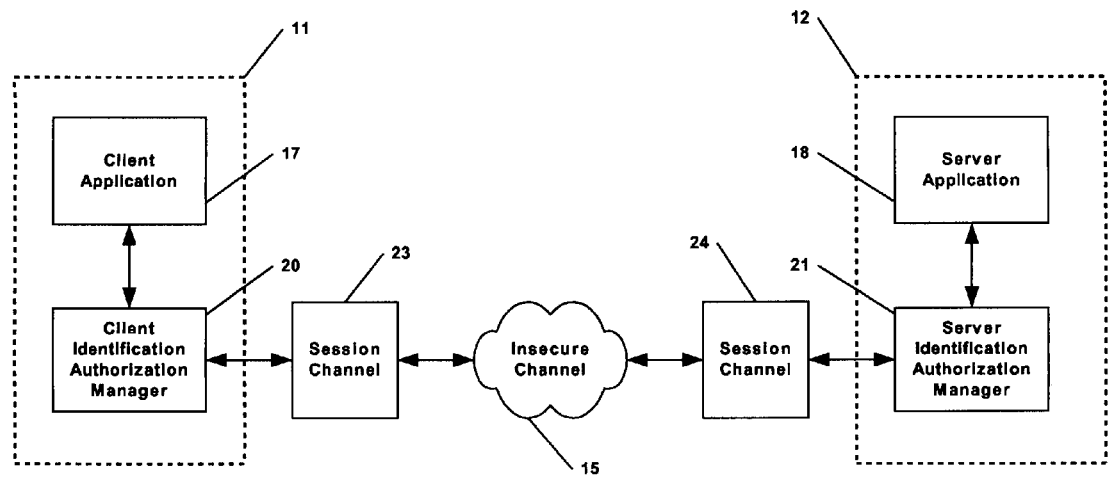
FIG. 1 is a block diagram of the high level components that embody the invention enabling secure identification and authorization.

Referring to FIG. 1, a secure identification and authorization system is depicted where the client is uniquely identified even when communicating over an insecure network. A client process 11 and a server process 12 attempt to establish communications over a potentially insecure channel 15. This insecure channel 15 may be a connection over the Internet, the public telephone network, or some other potentially insecure communications channel.

Client application 17 is running in client process 11 needs to establish a communications channel with server application 18 running in server process 12. Due to the nature of this communication, client application 17 and the server application 18 need to have the identity of each other confirmed. Once their identities are determined, then client application 17 and server application 18 need to determine if they are authorized to communicate.

Client application 17 uses the Client Identification and Authorization Manager 20 to initiate a communications channel to the server application 18. The Client Identification and Authorization Manager 20 opens a session channel 23 over the insecure communications channel 15 to start communication with the server application 18. The Server Identification and Authorization Manager 21 on the server process 12 accepts the session channel 24 and determines the identity of the client application 17. If the client application 17 is found as an authorized client by the Server Identification and Authorization Manager 21 on the server process 12, then the client application 17 and the server application 18 can start their communications session knowing that they have been identified and authorized to communicate.

Figure 2:
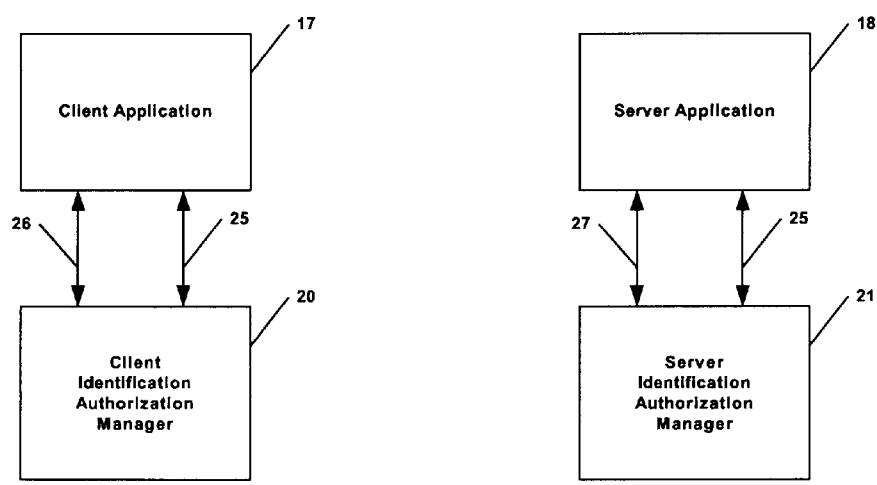
FIG. 2 is a block diagram showing the interfaces between generalized client and server applications and the system.

Referring to FIG. 2, the interfaces from the client application 17 and the server application 18 are depicted. The client application 17 communicates with the Client Identification Authorization Manager 20 through one of two primary channels. The command channel 26 is used to send commands to the Client Identification and Authorization Manager 20. The primary commands sent to the command channel 26 are those to connect to a named server, end a connection, signal the end of a transaction boundary, and finally to access the current variant cache. The data channel 25 is where the higher-level protocol/data is communicated to the server application 18.

The interfaces for the server application 18 and the Server Identification and Authorization Manager 21 are similar to those for the client application 17. The Server Identification and Authorization Manager 21 has a command channel 27 and a data channel 25. The command channel 27 is used to send commands to the Server Identification and Authorization Manager 21. The primary commands sent to the command channel 27 are those to accept connects from client applications, end a connection, signal the end of a transaction boundary, and finally to access the current variant cache. The data channel 25 is where the higher-level protocol/data is communicated to the client application 17.

Figure 3:
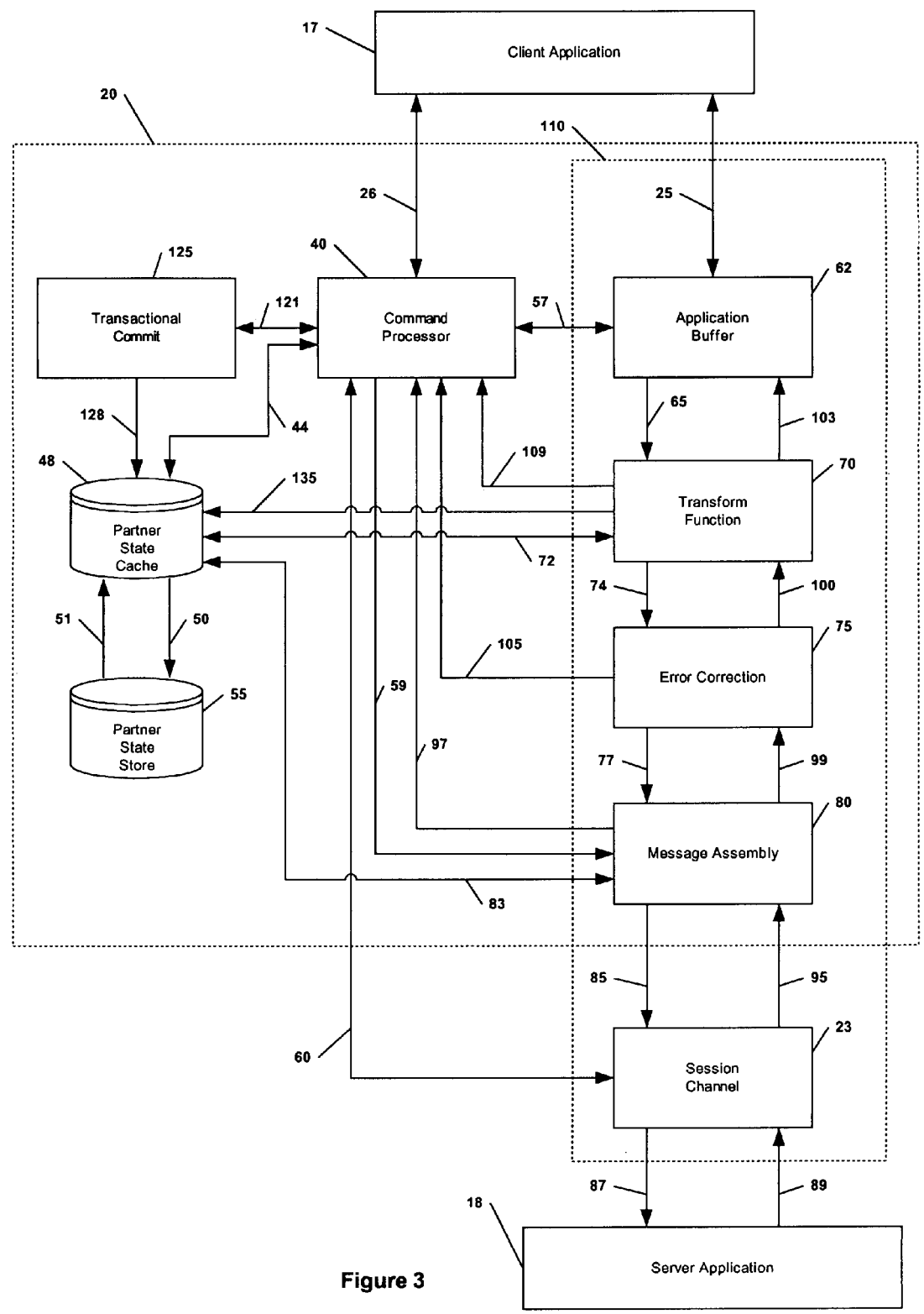
FIG. 3 is a block diagram showing the detailed components that are encompassed within the client identification and authorization manager.

Referring to FIG. 3, shows a detailed description of the components of the Client Identification and Authorization Manager 20. This figure is used to profile a flow through the system.

The client application 17 sends a command through the command channel 26 to the command processor 40 to connect to a named server. The Command processor 40 then makes a request 44 to the partner state cache 48 to load the partner state variables for the named server. The partner state cache 48 makes a load request 50 to the long-term storage partner state store 55 for the named server. The partner state store 55 will then attempt to look up the named server in the partner state store 55 and return the result 51 to the partner state cache 48. If the lookup operation was successful, then the state variables are loaded into the partner state cache 48 and a successful operation is communicated 44 to the command processor 40. If there is no state in the partner state store 55 for the named server, then an error operation is communicated 44 to the command processor 40 and an error is transmitted back 26 to the client application 17.

Assuming that the lookup operation for the named server state was successful in 51 then named server state variables are loaded into the partner state cache 48. These state variables will have at a minimum one session variable and one transient variable. More variables may be required based on the client application 17 requirements and the requirements of the transform function 70. The variables in the state may be any type of variant including, but not limited to, simple numeric values, states for a state machine, run-time evaluated functions, run-time loadable code fragments, values for a universal Turing machine, or any other variant.

Once the named server state has been successfully loaded into the partner state cache 48, the command processor 40 will signal 60 the session channel 25 to open a session with the named server. The session channel 25 is responsible for creating a communications session with the named server. Once the session is successfully established the session channel 25 notifies 60 the command processor 40 that a session is established. The command processor 40 then generates a request for identification and authorization. This request has a header protocol command which is sent 59 to the message assembly function 80 and a request body component 57 that is sent to the application buffer 62. The data sent 57 to the application buffer 62 includes a unique identifying signature from the partner state cache 48. This request is to identify the particular client application 17 and to start communicating with the server application 18.

The request in the application buffer 62 is then sent 65 to the transform function 70. The transform function 70 uses variable(s) 72 from the partner state cache 48 to encode or transform the data from the application buffer 62. This transformation function may any symmetric transformation function such as a substitution function, cryptographic function, of loss-less compression function, or any combination therein. A message authentication code may be appended as part of the assembled message prior to transmission 65. Once the data received 65 has been transformed, updated variables are sent back to the partner state cache 48 and the transformed data is sent 74 to the error correction function 75.

The optional error correction function 75 generates a simple message authentication code based on the data passed to it 74 from the transform function 70. The purpose of this function is to allow the server identification and authorization manager 21 determine if the message it receives is in fact unchanged and complete. This optional component is used when this function is not provided by the underlying session transport used in communication. Once this message authenticate code is generated it and the original message sent 74 are then passed 77 to the message assembly function 80.

The message assembly function 80 puts the header request received from 59, the message body generated by the transform function 70, and the message authentication code passed 77 from the error correction function 75. The last element added to the message before sending it to the server application 18 is a sequence ID from the partner state cache 48. This sequence ID is used to uniquely identify this request in the transaction. Once the sequence ID is added, the partner state cache 48 updates the sequence ID. Finally the completed message is sent to the server application 18 by communicating 85 across the session channel 23 on the communications link 87. At this point the server application 18 processes the request.

The server application has processed the request for identification and authorization and will send back its response over the session channel 23 using communications link 89. The session channel 23 then forwards this request 95 to the message assembly function 80.

The message assembly function 80 first checks to see if the message is properly formatted. If it is not properly formatted it will notify 97 the command processor 40. If it is properly formatted it will send 97 the protocol command header to the command processor 40. Next the message assembly function 80 will query 83 the partner state cache 48 for the expected sequence ID from the server application 18. If these do not compare, an error is sent 97 to the command processor 40 to signify the error. At this point the command processor 40 will signal 44 the partner state cache 48 that this named server is not in a valid state. The partner state cache 48 will mark the named server as such and save 50 the partner state to the partner state store 55.

Assuming that the sequence ID in the message 95 received by the message assembly function 80 is correct, the message body is sent 99 to the error correction function 75. The error correction function runs the message authentication code function against the message passed 99 and validates that the message is complete and unchanged. Any errors detected are sent 105 to the command processor 40.

Assuming that the message authentication code in message 99 was checked in the error correction function 75, then the message body is sent 100 to the transform function 70. The transform function 70 uses variable(s) 72 from the partner state cache 48 to decode or transform the data received 100. The message authentication code function is run against the decoded data and check for correctness. If this check proves invalid then The error 109 is sent to the command processor 40 to signify the encoding error. At this point the command processor 40 will signal 44 the partner state cache 48 that this named server is not in a valid state. The partner state cache 48 will mark the named server as such and save 50 the partner state to the partner state store 55.

Once the data received 99 has been transformed and verified, updated variables are sent back to the partner state cache 48 and the transformed data is sent 103 to the application buffer 62. This data is then sent to the command processor 57 to be joined with the command received 97 to acknowledge that the client application 17 and the server application 18 are properly identified and authorized to communicate. This authorization acknowledgement is then sent 26 to the client application 17.

The block labeled 110 is the generalized sending and receiving function. This function performs the steps above with either data straight from the client application 17 being sent or received 25 or from commands sent or received 57 from the command processor 40. The functions of encoding, assembling, and checking the validity of these messages is identical to that explained above.

Now that the client application 17 and the server application 18 have established a connection, authenticated, and properly identified each other, the client application 17 sends a service request to the server application 18.

The client application 17 sends a service request to the client identification and authorization manager 20 to securely transmit to the server application 18. The client application 17 does this by sending the request 25 to the application buffer 62. At this point the generalized sending function 110 will send the request 87 to the server application 18.

The server application 18 processes the request and sends the resulting response 89 to the generalized receiving function 110. The generalized receiving function 110 processes the response and returns 25 it from the application buffer 62 to the client application 17.

Now that the client application 17 has made a significant request of the server application 18 and received it's response, the client application 17 performs a logical communications transaction commit operation. These operations occur when the client application 17 and the server application 18 complete some logical unit of work. If the client application 17 and the server application 18 do not have easily defined logical units of work, then a transaction can be when an arbitrary amount of communications events or time have passed. The more frequently the transactions occur the more secure the system as a whole is.

The client application 17 sends 26 a transaction commit command to the command processor 40. The command processor 40 invokes 121 the transactional commit function 125 to start the transactional commit processes. The transactional commit function 125 notifies 128 the partner state cache 48 that a commit is about to occur. The transactional commit function 125 then sends 121 a commit command the command processor 40. The command processor 40 then sends a commit command 57 using the generalized sending function 110 to the server identification and authorization manager 21 (not the server application 18).

The server identification and authorization manager 21 then sends its response 89 to be processed by the generalized receive function 110. The transform function 70 in addition to its normal processing will send 135 nonce variable(s) to the partner state cache 48 to be used in the transactional commit. The command processor 40 receives 57 the response from the server identification and authorization manager 21 to start the transactional commit. This response 121 is sent to the transactional commit function 125. The transactional commit function 125 then sends 121 the appropriate commands to the command processor 40 to perform a two phased commit between the client identification and authorization manager 20 and the server identification and authorization manager 21. It is important to note that this two-phase commit is a two-phase commit with two systems of record.

The transaction commit function 125 performs the client identification and authorization manager 20 side of the two phase commit by using the nonce received 135 and using it to transform the current partner state cache 48 variables into a new state.

The series of events between the client application 17 and the server application 18 will continue until the logical work is completed. At least one transactional commit must occur before communications is terminated under normal operations.

Figure 4:
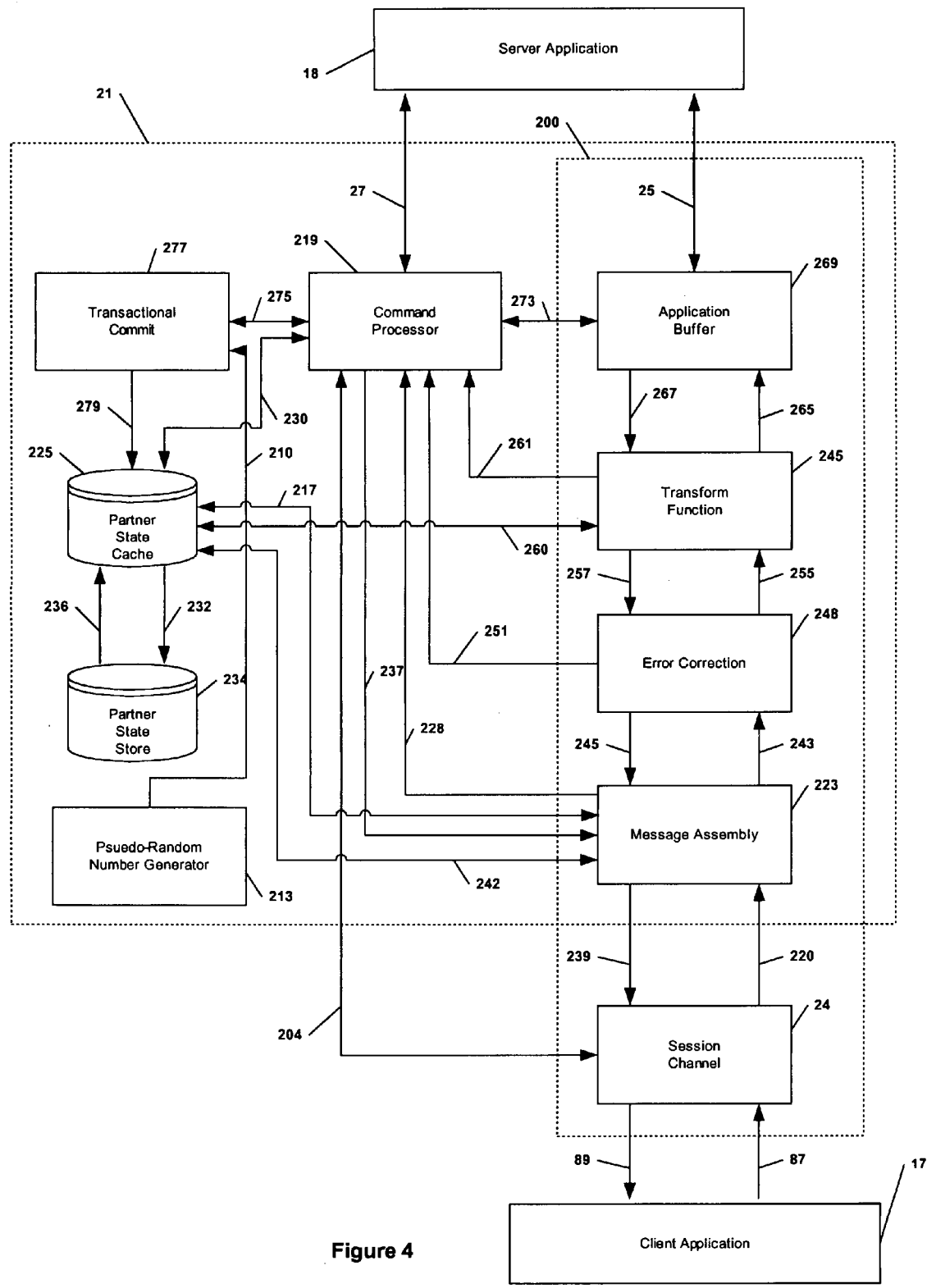
FIG. 4 is a block diagram showing the detailed components that are encompassed within the server identification and authorization manager.

Referring to FIG. 4, shows a detailed description of the components of the Server Identification and Authorization Manager 21. This figure is used to profile a server flow through the system that mirrors that described for FIG. 3 for the client. The interaction between the client system depicted in FIG. 3 and the server system depicted in FIG. 4 comprise the complete interaction required by this invention for a given client to operate successfully. There may be multiple client applications 17 that communicate with the same server application 18 depending on the specific business application of this invention.

The server application 18 sends a command through the command channel 27 to the command processor 219 to listen for and accept new client connection(s). The command processor 219 sends 204 a command to the session channel 26 to accept sessions from new client(s).

Once the session channel 26 accepts a session, it notifies 204 the command processor 219 that a client identification and authorization manager from client application 17 has initiated communications. Once the session channel 24 receives the request for identification and authorization is passed 220 to the message assembly function 223.

The message assembly function 223 will request a lookup of the state information 217 for the client identification and authorization manager 20 in the partner state cache 225. If the state information is not found, then the message assembly function 223 will send 228 a message to the command processor 219 to load the states for the specified client identification and authorization manager 20 in client application 17.

The command processor 219 then makes a request 230 to the partner state cache 225 to load the partner state variables for the specified client. The partner state cache 225 takes a load request 232 to the long-term storage partner state store 234 for the client. The partner state store 234 will then attempt to look up the client in the partner state store 234 and return the result 236 to the partner state cache 225. If the lookup operation was successful, then the state variables are loaded into the partner state cache 225 and a successful operation is communicated 230 to the command processor 219. If there is no state in the partner state store 234 for the specified client, then an error operation is communicated 230 to the command processor 219 and an error is transmitted back 237 to the message assembly function 223 which will send 239 a negative acknowledgement to the session channel 24 to end the session. Ending the session will terminate communications with the client application 17.

Assuming that the lookup operation for the specified client state was successful in 236 from the partner state store 234 then the named server state variables are loaded into the partner state cache 225. The partner state cache notifies the command processor 219 that the load was successful. The command processor 219 then sends 237 an acknowledgement to the message assembly function 223 which will then start processing the request for identification and authorization. The message assembly function will then use the partner state cache 225 information 242 to validate the request.

If the message assembly function 223 cannot validate the client request for identification and authorization, then a negative acknowledgement 239 is sent to the session channel 24 to terminate the communications to the client application 17. Once the negative acknowledgement is sent to the client application 17, then the session channel 24 is terminated with the client application 17.

The state variables loaded into the 225 partner state cache will have at a minimum one session variable and one transient variable. More variables may be required based on the client application 17 requirements and the requirements of the transform function 245. The variables in the state may be any type of variant including, but not limited to, simple numeric values, states for a finite state machine, run-time evaluated functions, run-time loadable code fragments, byte-code for a run-time virtual machine or interpreter, or any other variant.

Once the client state has been successfully loaded into the partner state cache 225, the command processor 219 will signal 237 the message assembly 223 to continue decoding and verifying the request for identification. Next the sequence ID is requested 242 from the partner state cache 225 and compared to the header values decoded in the message assembly 223 function.

If the message assembly function 223 cannot validate the client request sequence ID is identical to that from the partner state cache 225, then a negative acknowledgement 239 is sent to the session channel 24 to terminate the communications to the client application 17. Once the negative acknowledgement is sent to the client application 17, then the session channel 24 is terminated with the client application 17 and the partner state cache will be moved 242 to and invalid client ID state and saved 232 to the partner state store 234.

Once the sequence ID is validated from the client, the message is passed 243 to the error correction 248 function for validation. This function extracts the message authentication code inserted in the message by the client error correction 75 function and then generates a new message authentication code based on the rest of the message passed 243 to the function.

If generated message authentication code and the message authentication code extracted from message 243 are different then the command process 219 is signaled 251 to request a retransmit of the data from the client 20.

If the message authentication codes in the message are identical to the ones calculated by the error correction function 248 then the main payload portion of the message is passed 255 to the transform function 245 for decoding and verification. The transform function 245 uses variable(s) 260 from the partner state cache 225 to decode or transform the data received 255. The message authentication code function is run against the decoded data and check for correctness. If this check proves invalid then error 261 is sent to the command processor 219 to signify the encoding error. At this point the command processor 219 will signal 230 the partner state cache 225 that this client is not in a valid state. The partner state cache 225 will mark the client as such and save 232 the partner state to the partner state store 234.

Once the data received 87 has been transformed and verified, updated variables are sent back to the partner state cache 225 and the transformed data is sent 265 to the application buffer 269. This data is then sent to the command processor 273 to be joined with the command received 228 to acknowledge that the client application 17 and the server application 18 are properly identified and authorized to communicate. This authorization acknowledgement is then sent 27 to the server application 18 along with any needed payload data 25.

The server now generates a response to the request 25 from the client authenticated by 27 the command processor 219. The server send 27 and response command to the command processor 219 and sends the response data 25 to the application buffer 269.

The request in the application buffer 269 is then sent 267 to the transform function 245. The transform function 245 uses variable(s) 260 from the partner state cache 225 to encode or transform the data from the application buffer 269. This transformation function may any symmetric transformation function such as a substitution function, cryptographic function, of loss-less compression function, or any combination therein. A message authentication code may be appended as part of the assembled message prior to transmission 267. Once the data received 267 has been transformed, updated variables are sent back to the partner state cache 225 and the transformed data is sent 257 to the error correction function 248.

The optional error correction function 248 generates a simple message authentication code based on the data passed to it 257 from the transform function 245. The purpose of this function is to allow the client identification and authorization manager 20 determine if the message it receives is in fact unchanged and complete. This optional function is provided for those session level network transports that do not natively provide this function. Once this message authentication code is generated it and the original message sent 257 are then passed 245 to the message assembly function 223.

The message assembly function 223 puts the header request received from 237, the message body generated by the transform function 245, and the message authentication code passed 245 from the error correction function 248. The last element added to the message before sending it to the client application 17 is a sequence ID from the partner state cache 225. This sequence ID is used to uniquely identify this request in the transaction. Once the sequence ID is added, the partner state cache 225 updates the sequence ID. Finally the completed message is sent to the client application 17 by communicating 239 across the session channel 24 on the communications link 89. At this point the client application 17 processes the response.

The block labeled 200 is the generalized sending and receiving function. This function performs the steps above with either data straight from the server application 18 being sent or received 25 or from commands sent or received 273 from the command processor 219. The functions of encoding, assembling, and checking the validity of these messages is identical to that explained above.

Now that the client application 17 has made a significant request of the server application 18 and received it's response, the client application 17 performs a logical communications transaction commit operation. These operations occur when the client application 17 and the server application 18 complete some logical unit of work. If the client application 17 and the server application 18 do not have easily defined logical units of work, then a transaction can be when an arbitrary amount of communications events or time have passed. The more frequently the transactions occur the more secure the system as a whole is.

The server identification and authorization manager 21 receives a transaction commit command from the client application 17. The server application receives this request 87 from the session channel 24 and forwards 220 the request to the normal receiving process 200. When all processing and verifying is complete the command processor 219 is given a transaction commit request from 273.

The command processor then starts the transaction commit process by calling 275 the transactional commit 277 function to drive the transactional commit. The server identification and authorization manager 21 then has the transactional commit function handle the rest of the two phase commit process.

The transactional commit function 277 first gets a nonce from the queue 210 of the server's random number generator 213. This nonce is then passed 275 to the command processor 219 to be sent in the general send function 200 to the client.

The transactional commit function 277 then sends 275 the appropriate commands to the command processor 219 to perform a two phased commit between the server identification and authorization manager 21 and the client identification and authorization manager 20. It is important to note that this two-phase commit is a two-phase commit with two systems of record.

The series of events between the client application 17 and the server application 18 will continue until the logical work is completed. At least one transactional commit must occur before communications is terminated under normal operations.

The significant advancements in this invention over the existing solutions are perpetually changing keying material, transactional nature of the system, keying material is derived from the conversation between the client and server, additional keying material is derived from a systemic pseudo random number generator, all fraudulent operations are bounded, and additional nonces can be added to the system to tie application activity to the communications channel.

The keying material, the partner state store 55 on the client and 234 on the server, is updated when a transaction occurs perpetually and never reverting to a previous value set. This means that at the end of each logical transaction the system makes, the unique keying material for the system on both the client and the server are updated. Unlike some other key management and authentication systems, this invention does not revert to a master keying material value(s) upon reset, power down, or loss of communications.

Since at least one transaction commit must happen per communication session, this also means that no keying material remains unchanged after any given client-server interaction.

Unlike conventional cryptographic and authentication technologies, this invention embodies the notion of a logical transaction. The fact that the system is transactional provides a system that can move forward and persist the changes to the partner state store 55 on the client and 234 on the server in an atomic synchronization transactional commit. This is what allows this invention to provide robust perpetual advancement of the keying material.

Another significant advancement of this invention compared to today's practices are that part of the keys are derived from the data conversation between the client identification and authorization manager 20 and the server identification and authorization manager 21. Therefore part of the keying material for this invention is commonly derived from the conversation between the client and server. This means that no keying material is explicitly shared, but rather is derived. This conversation driven implied keying in effect adds unpredictability to the system as the server is not in complete control of the conversational material.

Differing from conventional systems, this invention uses a single server 21 side pseudo-random number generator 213 to feed all of the server and client needs for pseudo-random numbers. By having a single pseudo-random number generator feed all requests, and these request be dependant on system activity as to their number and frequency, you create a system that is unpredictable at any given client for all non-trivial implementations. This design in conjunction with the fact that the values generated by the systemic pseudo-random number generator being used as nonces, raises the difficulty of attacking the system cryptographically to a higher level.

Unique to this invention is the built-in audit capabilities that can bound most attempted and all successful attacks on the system. Because the audit capabilities are built into the invention, all successful attacks on the client and server are able to be bounded. This bounding allows you to determine when malicious activity started or was successful and know that prior to that time that the system was secure. If a subset record of previous server partner state store 234 and client partner state store 55 transactional records are kept as part of the store and not discarded, then when a fraudulent transaction is attempted or occurs it con be compared to previous partner state cache information to determine not only the type of attack but the time at with material was copied from a partner state cache to determine a point in time, or transaction, that starts the beginning of possible fraudulent transactions.

Unique to this invention is the ability to extend the identification and authorization capabilities into the client application 17 including the transactional commits and use on application nonces. This allows a client application 17 to get the same built-in audit and transaction capabilities of this invention in other applications. This capability removes the simple application programming interface (API) that most other identification and authorization methods use with a more tightly integrated approach that can not be subverted by simply replacing the API libraries with a fraudulent set of libraries.

Several other possible venues exist for the implementation of the present invention. For example, the invention may be advantageously employed for secure authentication and login, for secure credit card transactions, for secure communications tunnels, for secure VPN communications, and for automatic system login processes and the like as well as in other arenas.

The Partner State Store 55 need not be located on the same media/device as the rest of the Client Process 11. This allows the authentication between the Partner State Store 55 and the Server Process 12 to be portable between Client Processes 11. This allows from the authentication to be performed between the portable Partner State Store 55 and the Server Process 12 effectively extending the identification and authorization capabilities of the system and method to portable media such as a credit card, authorization token, or identification token.

Alternate implementations will also contain multiple nonces in the Client Application 11 Partner State Cache 48 that can be accessed by the Client Application 11 to be used as transactionally bound keying material to provide a transactionally changing key source for cryptographic functions. This alternate implementation would combine Client Application 11 identification and cryptographically secure communication.

What is claimed is:

1. A mutual authentication method for authenticating a mutual relationship between a client device and a server device connected via a communication line using transactional data communicated between the client and the server to independently derive keying material for authentication;

the method comprising the steps wherein;

the client creates a data transmission to send to the server device, retrieves a previous transactional characteristics stored for the server and uses the retrieved transactional characteristics to encode the data transmission request sent to the server;

the client calculates new transactional characteristics using the retrieved transactional characteristics and the data transmission to be sent to the server as input into a computational algorithm to derive a first new transactional characteristics;

the client contacts the server over the communications line and the server processes the client transmission by first retrieving a previous transactional characteristics stored for the client and validates the identity of the client using the retrieved transactional characteristics and the client data transmission as input to an algorithm to perform the validation;

the server calculates new transactional characteristics using the previous transactional characteristics and the client data transmission as input into a computational algorithm to derive a second new transactional characteristics;

the server processes the client transmission and generates a data transmission to send to the client device using the second new transactional characteristics to encode the server data transmission response to the client;

the server calculates new transactional characteristics using the previous transactional characteristics and the server data transmission to be sent to the client as input to a computational algorithm to derive a third new transactional characteristics;

the server sends the server data transmission as a response to the client over the communications line; the client calculates new transactional characteristics using the previous transactional characteristics and the data transmission sent from the server as input to a computational algorithm to derive a fourth new transactional characteristic and the client validates the identity of the server using the fourth new transactional characteristics;

the client processes the response and signals the server to complete the transaction wherein the server stores the current transactional characteristics associated with the client and acknowledges to the client that transaction is complete and the client receives the server acknowledgment and stores the current transactional characteristics associated with the server, wherein the transactional characteristics are used as keying material to encrypt the communication between the client and server devices.

2. The method according to claim 1, wherein multiple transmissions from the client to the server are processed in a single transaction so that the events align with external events.

3. The method according to claim 1, wherein the transactional characteristics are used as input to a computational algorithm to provide keying material to encrypt the communication between the client and the server devices.

4. The method according to claim 1, wherein the transactional characteristics are used as authentication tokens to external processes or systems separate from the communications between the client and server device.

5. The method according to claim 1, wherein an audit is facilitated by storing the transactional characteristics that were used during that transaction to identify a particular transaction.

6. The method according to claim 1, wherein the client is uniquely identified.

7. The method according to claim 1, wherein the server is uniquely identified.

8. The method according to claim 1, wherein the transactional characteristics are stored on a portable medium.

9. The method according to claim 8, wherein the client is identified not by the computer or device that is performing the operations of the client but by the transactional characteristics on the portable media.

10. The method according to claim 8, wherein the media itself is identified by the transactional characteristics on the portable media.

11. The method according to claim 8, wherein the portable media is uniquely identified.

12. The method according to claim 2, wherein the transactional characteristics are used to bound attacks.

13. The method according to claim 1, wherein attempted changes in the data communicated between the client and the server are detected.

14. The method according to claim 13, wherein the detection can bound attempted data changes.

15. The method according to claim 1, wherein duplicated transactional characteristics used to spoof a client or server is detected.

16. The method according to claim 15, wherein the attempted duplication is bound to a transaction or transactional range.

* * * * *